May 3, 1949.　　　A. C. COUTANT ET AL　　　2,468,814
EXPOSURE LENS FINDER FOR CAMERAS HAVING
ADJUSTABLE SIGHTING POSITION
Filed May 6, 1947　　　　　　　　　　　　　2 Sheets-Sheet 1
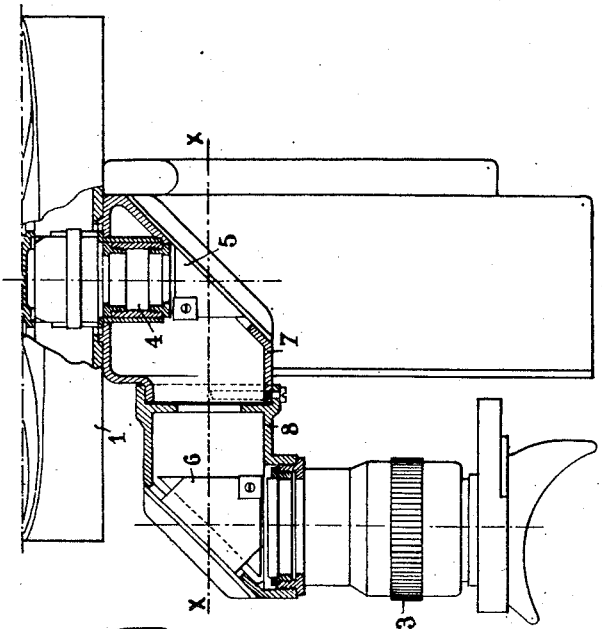
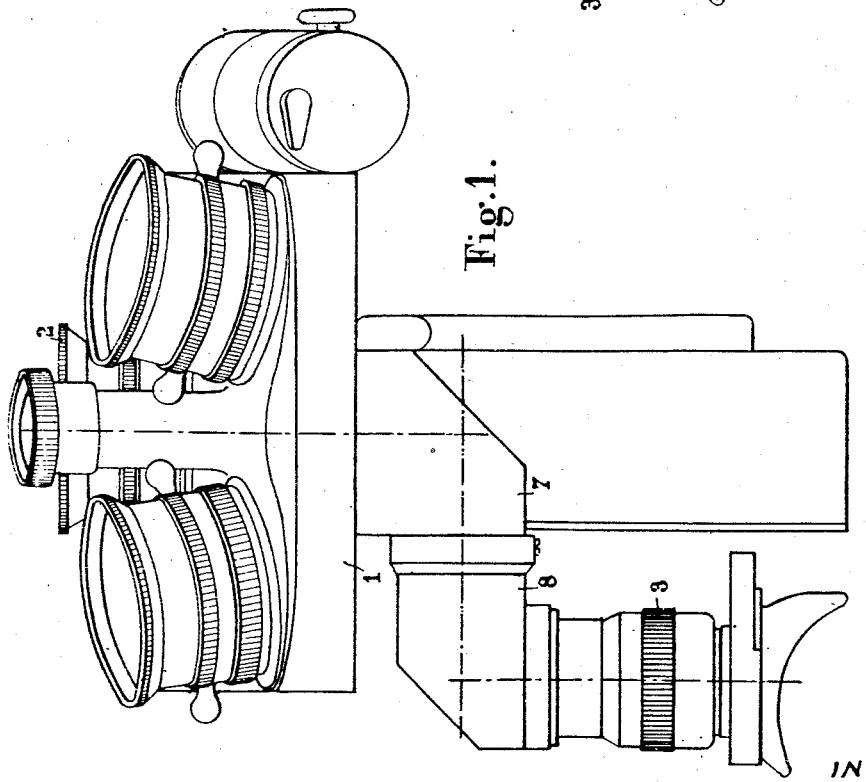
INVENTORS
Andre Clement Coutant
Jacques Mathot
By Robert E. Burns
ATTORNEY

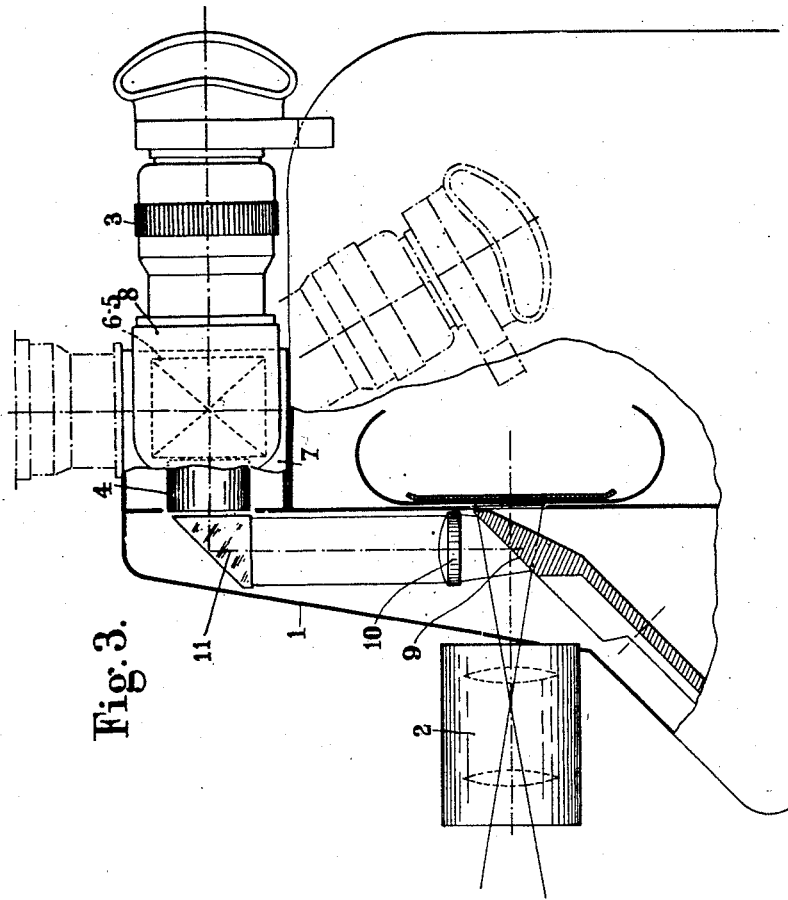

Patented May 3, 1949

2,468,814

UNITED STATES PATENT OFFICE 2,468,814

EXPOSURE LENS FINDER FOR CAMERAS HAVING ADJUSTABLE SIGHTING POSITION

André Clément Coutant and Jacques Mathot, Paris, France

Application May 6, 1947, Serial No. 746,300
In France May 7, 1946

1 Claim. (Cl. 95—42)

Generally, cinematographic cameras are provided with a view-finder magnifying glass having its optical axis parallel with the optical axis of the camera; frequently, the images which are seen through said glass have undergone a parallel displacement with the aid of a pair of parallel mirrors set at an angle of 45°, or of any other equivalent optical arrangement, notably in those cameras in which the object is sighted directly through the shooting lens without any parallax.

Now, it is sometimes quite inconvenient for the cameraman to be compelled to sight the object through the glass in a direction parallel with the optical axis of the camera by applying his eye on a level with said glass; thus, where the camera is laid directly on the ground, the cameraman is similarly compelled to lay himself on the ground; the same inconveniences are met with more or less wherever the optical axis of the glass is located above or below the level of the cameraman's eye.

Indeed, it has already been attempted to remedy this inconvenience by making the glass so orientable that its optical axis may at will be parallel with or perpendicular to the optical axis of the camera; this however has led to complement the view-finding optical system with elaborate, costly and bulky devices adapted to erect the images, this being however at the cost of their brilliancy. Consequently, the said devices have not met the desired success in spite of their indisputable usefulness.

This invention has for its object improvements to cinematographic cameras which consist notably in an arrangement permitting of tilting the sighting glass mounting about in axis at right angles to the optical axis of the camera without the addition of any supplemental optical system so that the cameraman is enabled to sight the object indifferently parallel with or at right angles to the direction of shooting.

For that purpose, according to this invention, the glass mounting is arranged to tilt about an axis providing the optical axis of the system of two parallel mirrors set at an angle of 45° or of any other equivalent optical system by which the image is offset just before it appears through the sighting glass.

Effectively, the image is not deformed in any way by such rotation of the glass mounting through an angle of 90°, the effect of this being only to tilt said image through an angle of 90° about the optical axis of the sighting glass. Such tilting will not inconvenience the cameraman who, besides, can avoid its effects by moving about the camera and setting himself laterally or, still more simply, by turning his head through an angle of 90°.

With a view to materialize the position to be occupied by the observer's eye in order that the image observed can be seen in the same position as if the glass mounting were not tilted it may be advantageous to arrange the eyepiece of the glass to partake of the tilting motion of said mounting about the optical axis of the glass so that it shall always occupy the same relative position with respect to the image; in this manner the set of the eyepiece of said glass is a good evidence to the user of the position he must assume with respect to the camera in order to sight normally through the glass.

An embodiment of the present invention is illustrated diagrammatically by way of example in the appended drawing.

Figure 1 is a plan view;

Figure 2 is a fractional view partly in section;

Fig. 3 is a fragmentary vertical section taken on the center line of lens 4 shown in Fig. 2, and showing a conventional arrangement of optical system for collecting light rays from the object lens and shifting them transversely so as to pass through the lens 4.

The camera illustrated comprises a rotatable turret 1 provided with three different lenses one of which is in shooting position at 2. The observer is enabled to aim his camera by sighting through the glass 3 and the shooting lens 2.

Once the image collected by the object lens is shifted transversally by a pair of parallel mirrors set at an angle of 45° as shown in Fig. 3, it is taken up by the lens 4, then shifted transversally by right-angled prisms 5 and 6 and finally observed through the lens 3. In the Figure 3 disclosure, 9 designates a mirrored surface, 10 a ground glass, and 11 a prism adapted to project the image through the lens 4.

The glass mounting is designed to rock about the axis X—X, for which purpose it is made up of two parts 7, 8 fitting in one another in groove-and-tongue fashion in such manner that the member 8 and the glass mounting 3 can swivel with respect to member 7 which is rigid with the camera as a whole.

It is to be understood that the invention is by no means limited to the embodiment described in the above with reference to the appended drawing and that many modifications may be made without thereby departing from the scope of this invention; thus, in particular, the right-angled prisms may be replaced by parallel mirrors, optical squares or any other equivalent system; moreover the invention can as well be applied to photographic cameras and notably to those in which view-finding is carried out through the shooting lens.

What we claim as our invention and desire to secure by Letters Patent is:

In a cinematographic camera having an object lens, a view finder comprising a housing portion in fixed position on the camera, a lens mounted in said housing with its axis parallel to, but offset transversely from, the axis of the object lens, an optical system for collecting light rays from the object lens and shifting them transversely so as to pass through the first mentioned lens, means provided in the housing portion for bending at right angles the rays passing through the first mentioned lens so that the axis of the bent rays is perpendicular to a vertical plane passing through the axis of the object lens, said housing having a circular neck portion concentric with the axis of said bent rays, a second housing portion having a circular neck portion having a tongue and groove connection with the neck of the first housing portion to provide for rotation of the second housing portion about the axis of said bent rays, means for limiting said rotation to 90°, means carried by the second housing portion for bending said rays at right angles, a tubular extension carried by the second housing portion with its axis perpendicular to the axis of rotation of said portion, an occular lens mounted in said tubular extension.

ANDRÉ CLÉMENT COUTANT.
JACQUES MATHOT.

REFERENCES CITED

The following references are of record in the file of this patent:

UNITED STATES PATENTS

| Number | Name | Date |
| --- | --- | --- |
| 1,310,776 | Akeley | July 22, 1919 |
| 1,607,688 | Perrin et al. | Nov. 23, 1926 |
| 1,836,240 | Ross | Dec. 15, 1931 |
| 2,231,036 | Suverkrop | Feb. 11, 1941 |
| 2,343,015 | Lewis | Feb. 29, 1944 |